Jan. 13, 1925.
V. E. CLARK
1,522,672
TAIL SKID FOR AIRCRAFT
Filed April 26, 1923       2 Sheets-Sheet 2
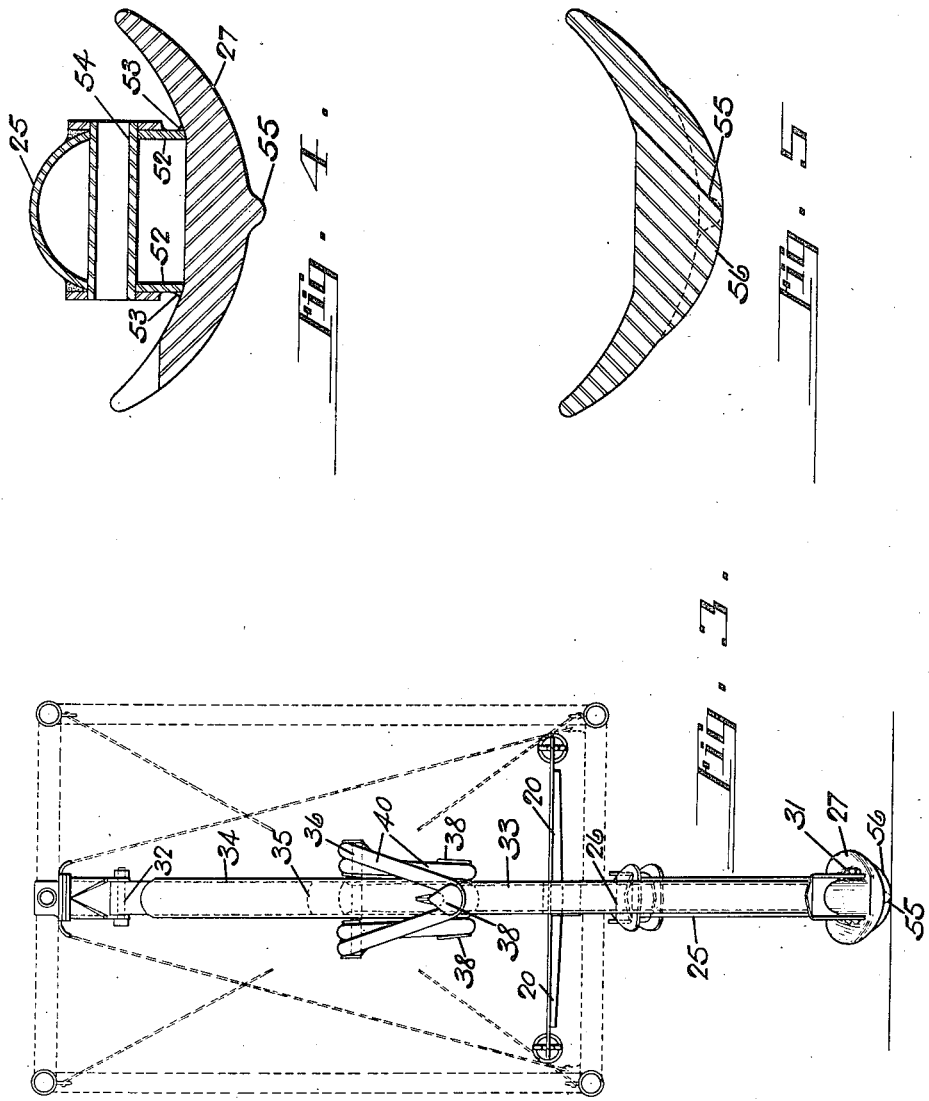

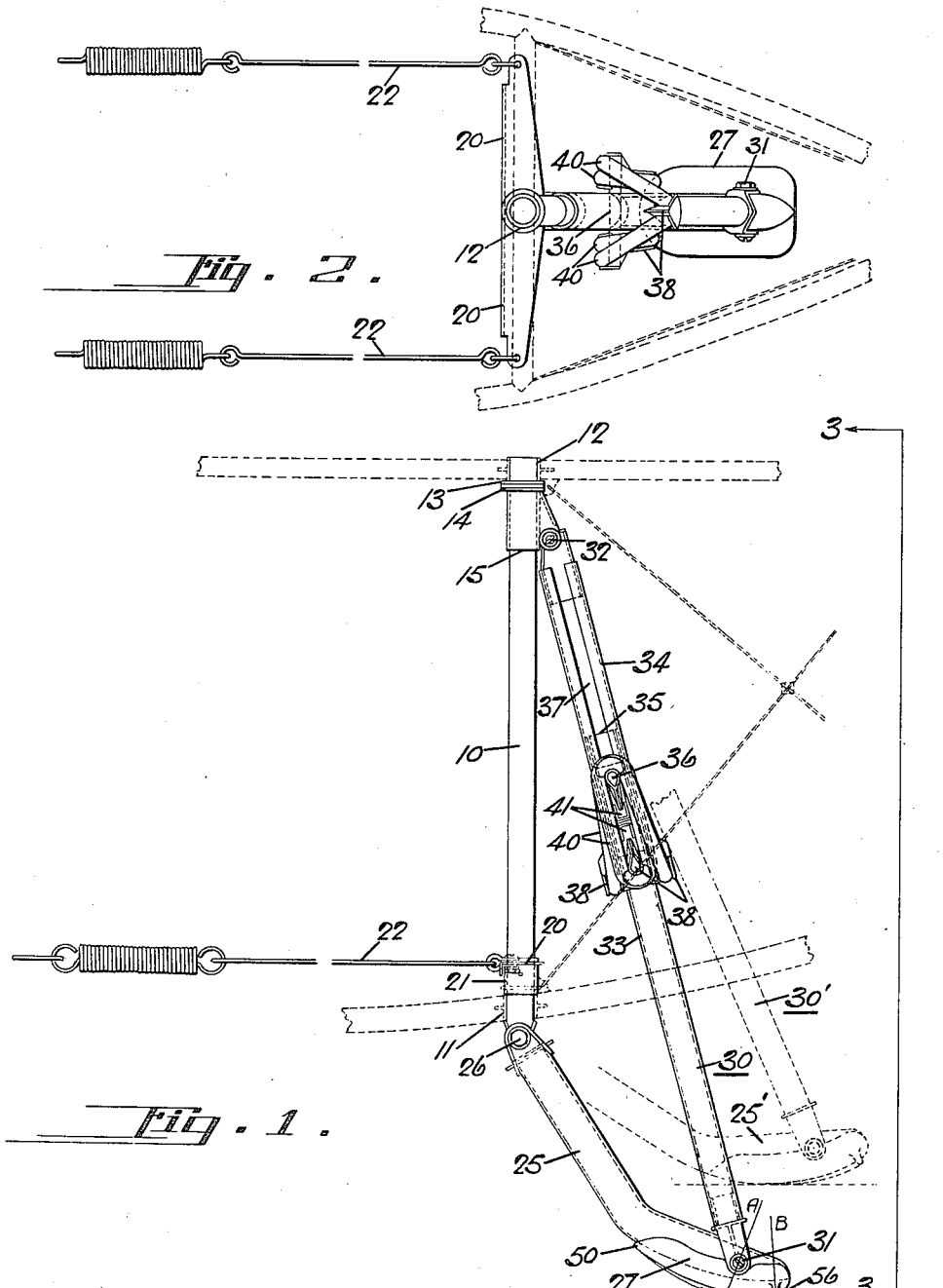

Patented Jan. 13, 1925.

1,522,672

UNITED STATES PATENT OFFICE.

VIRGINIUS E. CLARK, OF DAYTON, OHIO, ASSIGNOR TO DAYTON-WRIGHT COMPANY, OF DAYTON, OHIO, A CORPORATION OF DELAWARE.

TAIL SKID FOR AIRCRAFT.

Application filed April 26, 1923. Serial No. 634,667.

*To all whom it may concern:*

Be it known that I, VIRGINIUS E. CLARK, a citizen of the United States of America, residing at Dayton, county of Montgomery, and State of Ohio, have invented certain new and useful Improvements in Tail Skids for Aircraft, of which the following is a full, clear, and exact description.

This invention relates to ground skids and is especially adapted for use on aircraft.

An object of this invention is to provide a ground skid of simple, strong and efficient construction which is very reliable in service.

Another object is to provide a dirigible tail skid which requires a minimum space within the fuselage in which to swing, and hence more space is provided for other purposes, as for instance the internal fuselage braces.

Another object is to provide a tail skid shock absorbing unit which may have a shock absorber cord quickly attached or detached for replacement or repairs.

Further objects and advantages of the present invention will be apparent from the following description reference being had to the accompanying drawings wherein preferred forms of the present invention are clearly shown.

In the drawings:

Fig. 1 is a side elevation of the tail skid unit and showing the fuselage parts in dotted lines.

Fig. 2 is a plan view thereof.

Fig. 3 is a rear elevation thereof on line 3—3 of Fig. 1.

Fig. 4 is a section on line A—A of Fig. 1, and,

Fig. 5 is a section on line B—B of Fig. 1.

Similar reference characters refer to similar parts throughout the several views.

The vertical supporting strut 10 is rotatably mounted within the bearings 11 and 12 upon the rigid framework of the fuselage. The top bearing 12 is provided with a flange 13 at its bottom which cooperates with a similar flange 14 on the fitting 15 to form thrust bearing to transmit the upward thrust on the skid to the fuselage frame. Of course the fitting 15 is pinned or otherwise suitably secured to the strut 10.

A rocker lever 20 having a hub or boss 21 is pinned or otherwise suitably secured to the strut 10 at its lower end immediately above the bearing 11. The lower face of the boss 21 rests upon the upper face of bearing 11 and thus the weight of the tail skid unit is carried by the fuselage frame. The tail skid 25 is pivoted to the lower projecting end of strut 10 at the pin 26. A shoe 27 is provided for the lower end of the skid where it contacts with the ground. A telescoping shock-absorbing strut or brace 30 is pivoted at 31 to the lower end of skid 25 at or near its point of contact with the ground, and at its other end is pivoted to the fitting 15 at the pin 32, as will be readily understood. This strut 30 therefore will carry practically all the upward load on the tail skid up to the thrust bearing 13, 14.

Since practically all the upward thrust is in the strut 30 the yieldable shock-absorbing means is located therein, preferably at some point within the fuselage to minimize air resistance. The particular form of yieldable strut shown in the drawings will be described herein, however any other form of elastic brace or strut which may be shortened under compression may be used with this invention. The lower part of strut 30 is designated by numeral 33 and the upper part by 34. Parts 33 and 34 are shown as steel tubes, 34 being of greater diameter so that 33 will telescope therein. Preferably the lower end of tube 34 is provided with a suitable bearing bushing for tube 33 to slide through, and the upper end of tube 33 is provided with an enlarged head 35 which bears on the inner walls of tube 34. The upper end of tube 33 is also provided with a cross pin 36 which projects laterally outward on each side through the long slots 37 in the tube 34. The lower end of tube 34 is provided with the four projections or lugs 38 which are suitably provided with small flanges to prevent the shock absorber cord 40 from slipping off. This shock absorber cord 40 is first formed into an endless loop of the desired length and then wrapped around the projecting lugs 38 and 36 in the manner clearly shown in the drawings, it of course being necessary to stretch the cord while being wrapped in order to give an initial tension on the cord when the yieldable strut 30 is at maximum length. With this form of shock-absorber cord it is a very simple matter to replace the cord when the plane is on the field with another cord made into a loop of the same length and thus obtain the same initial tension on the cord.

When the skid contacts with the ground in landing the lower tube 33 telescopes within the upper tube 34, and of course the pin 36 attached to tube 33 travels upward along the open slots 37. The lugs 38 being attached to tube 34 remain stationary and hence the four loops of the shock-absorber cord 40 are stretched an amount according to the upward force on the tail skid. Suitable stops 41 are provided to cause tubes 33 and 34 to overlap at all times a distance sufficient for strength when the strut 30 is at its maximum length. When the tail skid 25 moves up into the dotted position 25' (see Fig. 1) the yieldable strut 30 is shortened and swings to the position 30' as will be readily understood.

Fig. 4 illustrates one method of attaching the shoe 27 to the tubular steel skid 25. The tube 25 is split from point 50 (see Fig. 1) to the end and the sides spread and flattened as shown at 52 in Fig. 4. The shoe 27 is welded to the sides 52 as shown at points 53. The bushing 54 extends laterally across the tube 25 and is preferably welded in place to reinforce tube 25 and to receive the bolt 31. A longitudinal fin 55 is provided on the bottom surface of shoe 27 to prevent the shoe 27 from sliding sidewise over the ground and thus the machine may be steered while taxing by directing the tail skid. The entire tail skid unit comprising the skid 25 and the struts 10 and 30 may be all rotated as a unit within bearings 11 and 12 by means of the rocker lever 20 and the operating rods or cables 22 which lead to some convenient manual operating means at the cock pit, preferably the ordinary rudder bar. The shoe 27 may be also provided with the transverse fin 56 at the rear portion of its bottom surface (see Fig. 1) which acts to increase the braking effect of the skid.

While the form of embodiment of this invention as herein disclosed, constitutes preferred forms, it is to be understood that other forms might be adopted, all coming within the scope of the claims which follow.

What I claim is as follows:

1. In an aircraft having a fueslage, a tail skid support rotatably mounted upon said fuselage and enclosed within the body thereof, a tail skid pivoted at its upper end to said support, and a yielding strut member pivotally attached at its upper end to the upper portion of said support and pivotally attached to its lower end to said skid.

2. In an aircraft having a fuselage, a tail skid support rotatably mounted upon said fuselage and enclosed within the body of said fuselage, a tail skid pivoted at its upper end to said support, and a yieldable telescoping strut member pivotally attached at its upper end to the upper portion of said support and pivotally attached at its lower end to said skid.

3. In an aircraft having a fuselage, a tail skid support rotatably mounted within said fuselage and extending substantially the full vertical depth of said fuselage, a tail skid pivoted at its upper end to said support, and a yielding strut member pivotally attached at its lower end to said skid and at its upper end to the upper portion of said support, and means for rotating said support within its mountings whereby the tail skid may be used for steering.

4. In an aircraft, a vertical member rotatably mounted therein, a ground skid pivotally mounted at its upper end to said vertical member, and a yielding shock-absorbing brace member connecting the lower end of the skid to said vertical member.

5. In an aircraft, a vertical member rotatably mounted therein, a ground skid pivotally mounted at its upper end to said vertical member, and a yielding brace member connecting the lower end of the skid to said vertical member, and means for directing said vertical member whereby said ground skid is directed.

6. A shoe for a dirigible ground skid having a longitudinal fin on its bottom surface for steering purposes, and a transverse fin for braking purposes.

In testimony whereof I hereto affix my signature.

VIRGINIUS E. CLARK.

Witnesses:
ELMER E. REED,
WALTER W. REIDEL,